(12) United States Patent
Yeo et al.

(10) Patent No.: US 8,711,080 B2
(45) Date of Patent: Apr. 29, 2014

(54) BACKLIGHT ASSEMBLY, METHOD FOR DRIVING BACKLIGHT ASSEMBLY, AND LIQUID CRYSTAL DISPLAY HAVING THE SAME

(75) Inventors: Dong Min Yeo, Daegu (KR); Gi Cherl Kim, Yongin-Si (KR); Byung Choon Yang, Seoul (KR); Se Ki Park, Suwon-Si (KR); Yong Hoon Kwon, Asan-Si (KR)

(73) Assignee: Samsung Display Co., Ltd. (KR)

( * ) Notice: Subject to any disclaimer, the term of this patent is extended or adjusted under 35 U.S.C. 154(b) by 887 days.

(21) Appl. No.: 12/218,452

(22) Filed: Jul. 11, 2008

(65) Prior Publication Data

US 2009/0021469 A1    Jan. 22, 2009

(30) Foreign Application Priority Data

Jul. 20, 2007    (KR) ........................ 10-2007-0072996

(51) Int. Cl.
*G09G 3/36*    (2006.01)
(52) U.S. Cl.
USPC ............................... 345/102; 345/87; 345/88
(58) Field of Classification Search
USPC ........................................................ 345/102
See application file for complete search history.

(56) References Cited

U.S. PATENT DOCUMENTS

| 5,191,444 | A * | 3/1993 | Harada et al. | 358/3.21 |
| 7,039,229 | B2 * | 5/2006 | Lin et al. | 382/165 |
| 2003/0020703 | A1 * | 1/2003 | Holub | 345/207 |
| 2005/0156943 | A1 * | 7/2005 | Fujioka et al. | 345/589 |
| 2006/0061538 | A1 * | 3/2006 | Dispoto et al. | 345/102 |
| 2008/0150853 | A1 * | 6/2008 | Peng et al. | 345/87 |

FOREIGN PATENT DOCUMENTS

| JP | 08-313879 | 11/1996 |
| JP | 2001-112019 | 4/2001 |

\* cited by examiner

*Primary Examiner* — Alexander Eisen
*Assistant Examiner* — Mark Regn
(74) *Attorney, Agent, or Firm* — Innovation Counsel LLP (57) ABSTRACT

There is provided a backlight assembly that supplies light to an LCD panel. The backlight assembly includes an LED assembly and a backlight unit. The LED assembly includes at least one LED block region having a plurality of LEDs. The backlight unit driving unit includes a color control unit that determines a representative color of the LED block region using an image signal supplied to the LCD panel, and a dimming control unit that controls the color of the LED block region based on the representative color determined by the color control unit.

20 Claims, 10 Drawing Sheets
(3 of 10 Drawing Sheet(s) Filed in Color)

BACKLIGHT ASSEMBLY, METHOD FOR DRIVING BACKLIGHT ASSEMBLY, AND LIQUID CRYSTAL DISPLAY HAVING THE SAME

CROSS-REFERENCE TO RELATED APPLICATION

This application claims priority to Korean Patent Application No. 10-2007-0072996 filed on Jul. 20, 2007, the contents of which are incorporated by reference in their entirety.

BACKGROUND OF THE INVENTION

1. Field of the Invention

The present invention relates to an LCD equipped with a backlight assembly and, in particular, to an LCD having a color-dimmable backlight unit, and a method of dimming the LCD.

2. Description of the Related Art

Among flat panel display devices, an LCD needs a light source. Typical light sources are point light sources, such as a light emitting diode ("LED"), or linear a light sources, such as electroluminescent lamp ("EL") and cold cathode fluorescent lamp ("CCFL").

Local dimming for products employing a backlight unit using LEDs can improve contrast ratio and reduce power consumption. Specifically, the improvement of contrast ratio and reduction in power consumption are accomplished by dividing the entire display region into a plurality of blocks and correcting light leakage that causes gamma curve distortion by dimming respective ones of the blocks.

In order to realize local brightness dimming, brightness for each block is extracted by averaging the incoming red, green, and blue image data for the corresponding block. When the local dimming is performed by brightness-dimming, the contrast ratio is improved, but color display characteristics such as color reproducibility needs to be improved.

SUMMARY OF THE INVENTION

An aspect of the present invention provides a backlight assembly capable of both color-dimming and brightness-dimming at the same time, an LCD equipped with the backlight unit, and a method of dimming the LCD.

Another aspect of the invention provides a backlight assembly having high color reproducibility and low power consumption, an LCD equipped with the backlight assembly, and a method of dimming the LCD.

According to an aspect of the invention, there is provided a backlight assembly that supplies light to an LCD panel. The backlight assembly includes an LED assembly and a backlight unit. The LED assembly includes at least one LED block region having a plurality of LEDs. The backlight unit driving unit includes a color control unit that determines a representative color of the LED block region using an image signal supplied to the LCD panel, and a dimming control unit that controls the color of the LED block region based on the representative color determined by the color control unit.

The backlight unit driving unit may further include: color class table information having a plurality of color classes including color gradations and a memory that stores color coordinate system table information, including a plurality of color regions in the color coordinate system. The LCD panel may include at least one or LCD panel block region corresponding to LED block region. The color control unit may define a color region that is representative of the color classes of image signals that are most frequently mapped. The representative color may be determined as the color of the LED block region.

The backlight assembly may further include a brightness control unit that determines the brightness of the LED block regions and supplies brightness control signals to a dimming control unit. It is effective that the brightness control unit determines an average brightness of brightness signals supplied to the LCD panel block regions as a representative brightness. The LED may include red, green, and blue LEDs.

According to another aspect of the invention, an LCD includes: an LCD panel to display images; an LCD panel driving unit that drives the LCD panel; an LED assembly that supplies light to the LCD panel and includes at least one LED block regions having a plurality of LEDs; and a backlight unit driving unit. The backlight unit includes a color control unit that determines a representative color of the LED regions using an image signal supplied to the LCD panel, and a dimming control unit that controls the colors of the LED block regions on the basis of the representative color determined by the color control unit.

The LCD panel may include a plurality of LCD panel block regions, and the LED block regions may correspond to the LCD panel block regions.

The LCD panel driving unit may include a field-programmable gate array ("FPGA"), and image signals may be distributed to the LCD panel block regions and the LED block regions by a signal distributor.

The backlight unit driving unit may further include a brightness control unit that determines an average brightness of the LED block regions using image signals distributed from the signal distributor and supplies brightness control signals to the dimming control unit. The FPGA may include a color control unit and a dimming control unit. The FPGA may further include a brightness control unit.

The LEDs may include red, green, and blue LEDs. The LED may further include a white LED for brightness control, in addition to the red, green, and blue LEDs for color control.

According to still another aspect of the invention, a method of dimming an LCD includes: classifying color classes of pixels of LCD panel block regions; determining a representative color from the color classes; and adjusting the color of the LED block regions corresponding to the block regions of the liquid crystal display panel to the representative color.

Classifying the color classes of pixels of LCD panel block regions may include: storing color class table information into a memory; extracting image signals of the pixels in the LCD panel block regions; and classifying the color classes by comparing the image signals with the color class table information.

Storing the color class table information into the memory may include: dividing red, green, and blue into predetermined color gradations; grouping adjacent color gradations of the color gradations into a color class; and storing color class table information into the memory after arranging the color classes in a table.

Determining the representative color from the color classes may include: mapping the color classes into a color coordinate system; and determining a color region into which color classes are most frequently mapped in the color coordinate system as a representative color.

Mapping the color classes into the color coordinate system may include: dividing the color coordinate system into a plurality of color regions; and mapping the color classes into corresponding color regions.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee. The above and other features and advantages of the invention will become more apparent by describing in detail preferred embodiments thereof with reference to the attached drawings in which.

DESCRIPTION OF THE PREFERRED EMBODIMENTS

Preferred embodiments of the invention are now described in detail hereinafter with reference to accompanying drawings.

Figure 1:
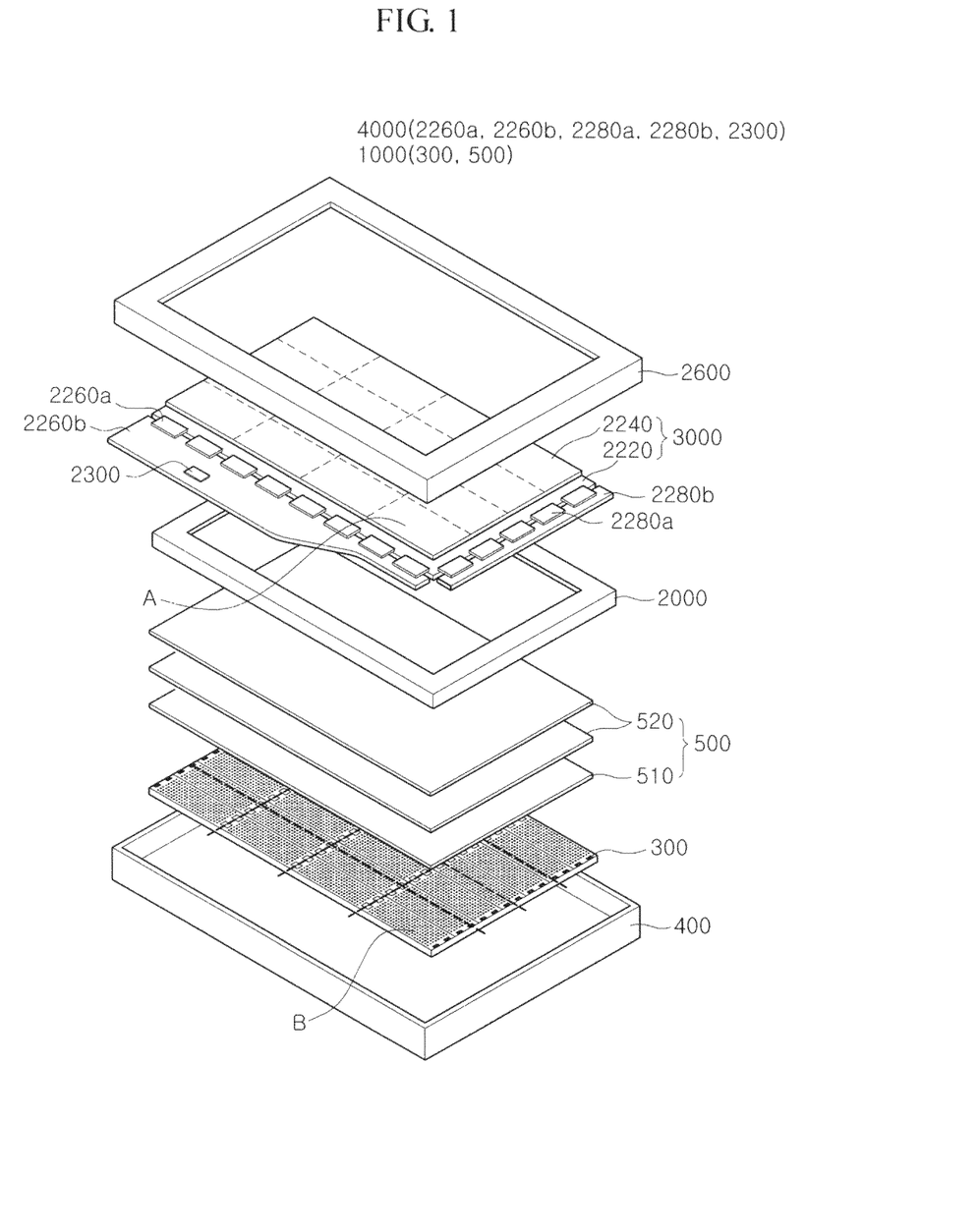
FIG. 1 is a schematic exploded perspective view of an LCD according to a first embodiment of the invention.
Figure 2:
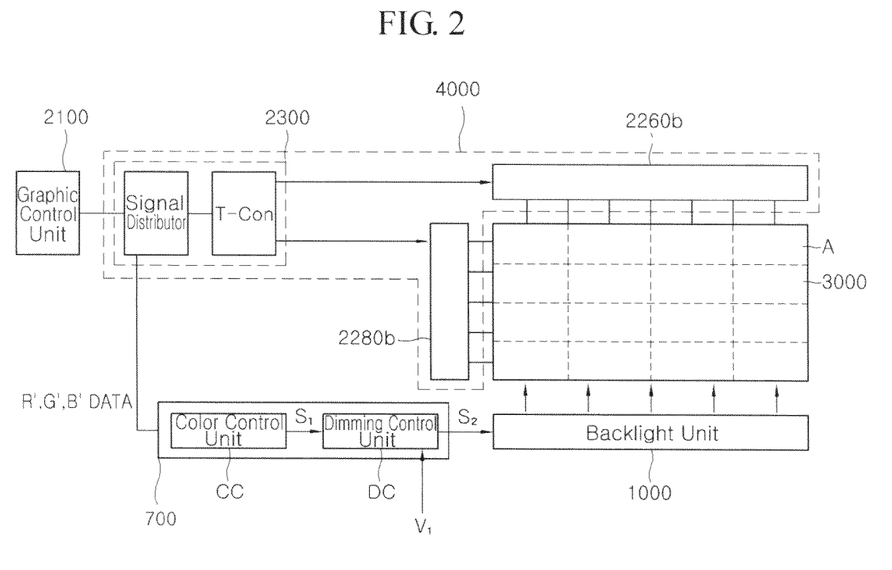
FIG. 2 is a schematic diagram of the LCD according to the first embodiment of the invention.
Figure 3:
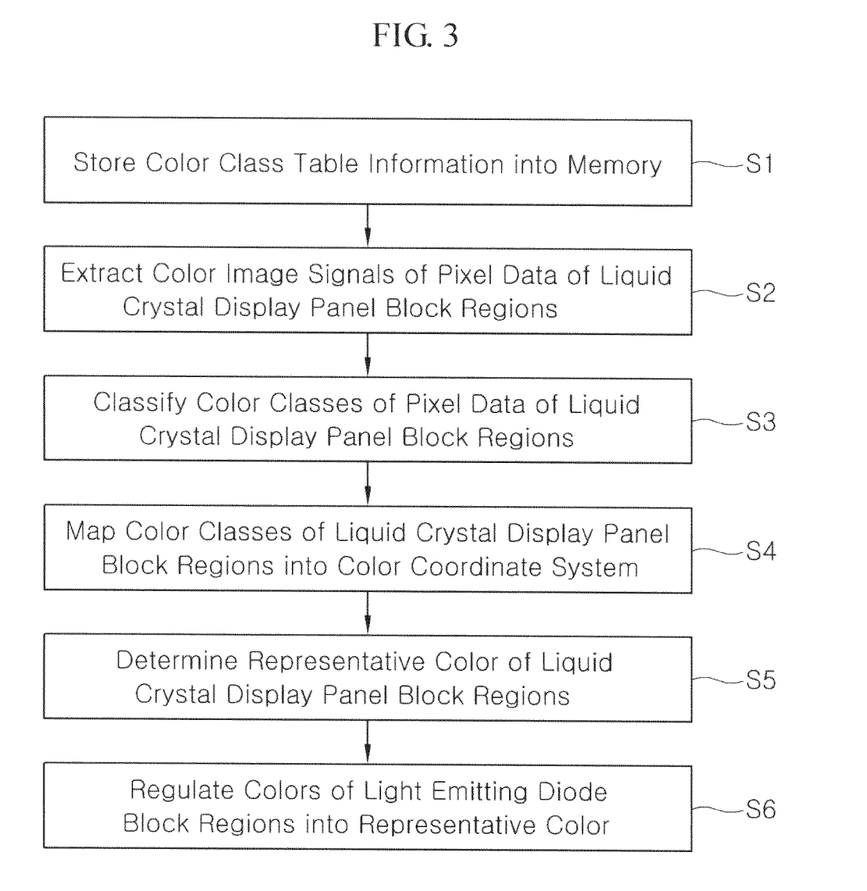
FIG. 3 is a flowchart illustrating a process of color-dimming in the LCD according to the first embodiment of the invention.
Figure 4:
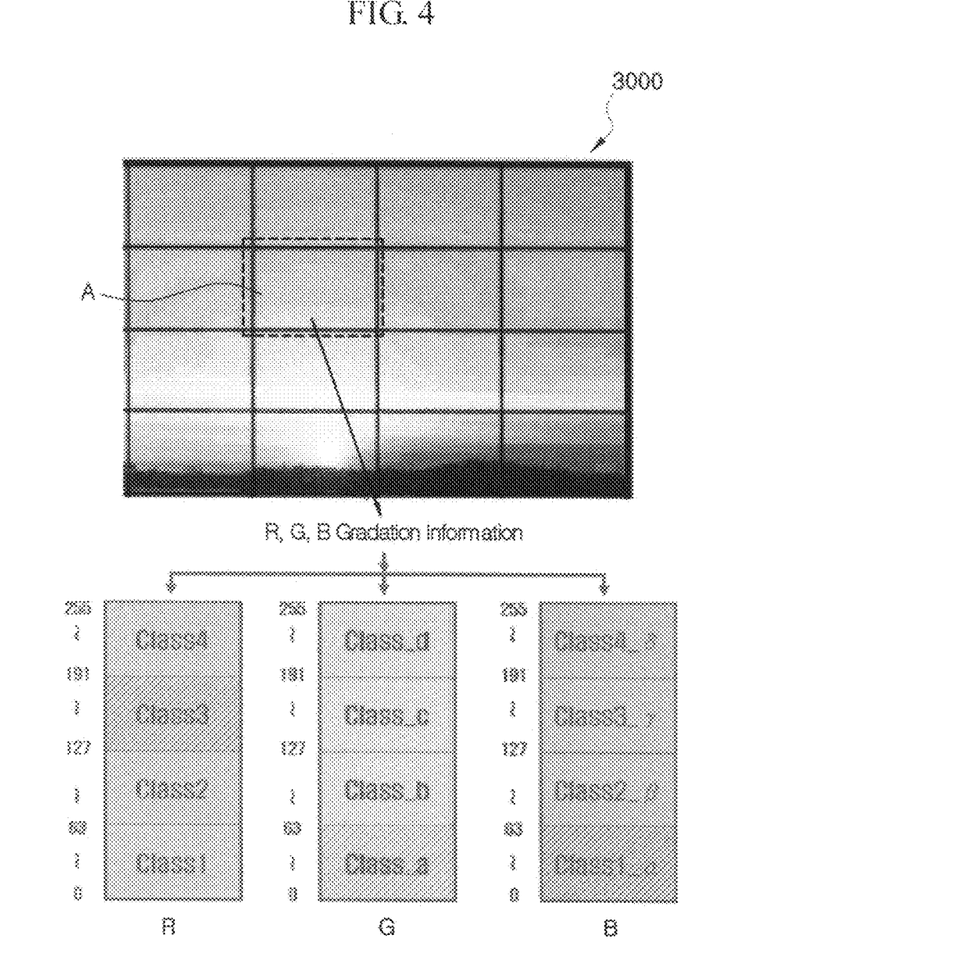
FIGS. 4 and 5 are views illustrating a method of separating color information for color-dimming in the LCD according to the first embodiment of the invention.
Figure 5:
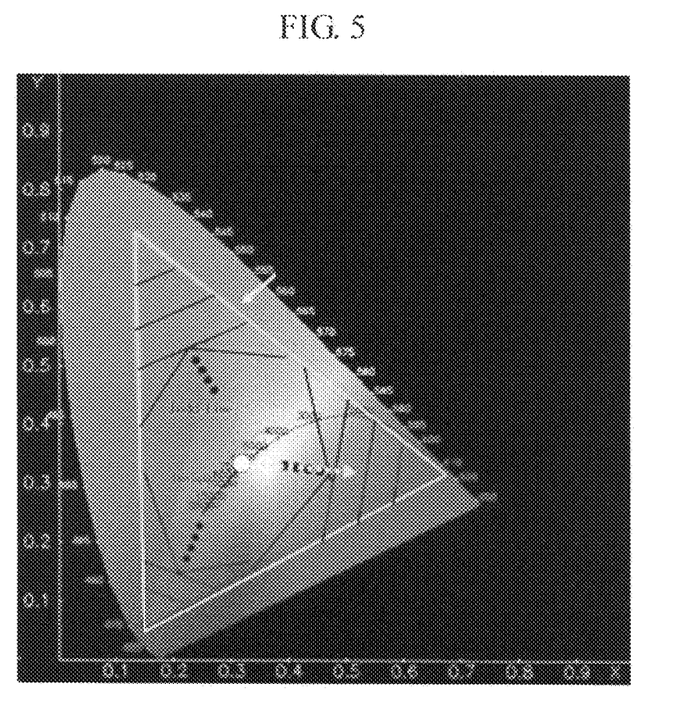
Figure 6:
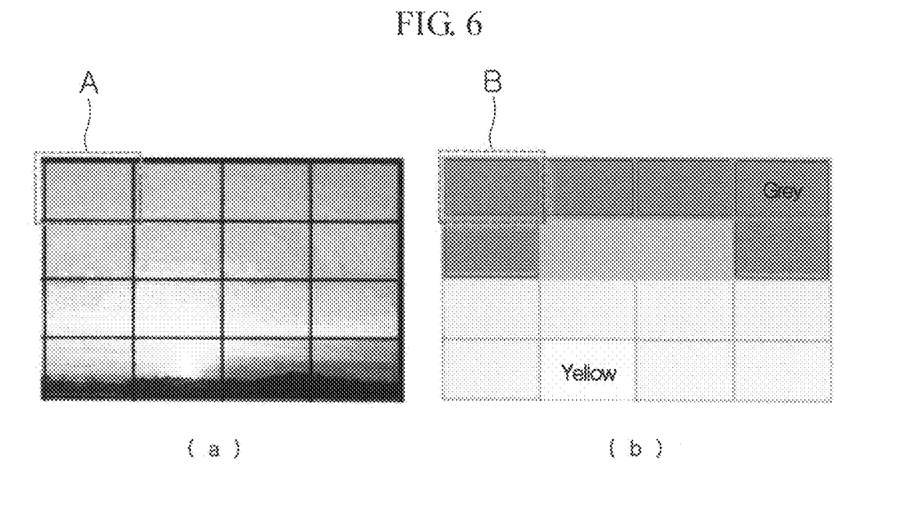
FIGS. 6A and 6B are views illustrating a process of color-dimming in the LCD according to the first embodiment of the invention.

FIG. 1 is a schematic exploded perspective view of an LCD according to a first embodiment of the invention. FIG. 2 is a schematic diagram of the LCD according to the first embodiment of the invention. FIG. 3 is a flowchart illustrating a process of color-dimming in the LCD according to the first embodiment of the invention. FIGS. 4 and 5 are views illustrating a method of separating color information for color-dimming in the LCD according to the first embodiment of the invention. FIGS. 6A and 6B are views illustrating the process of color-dimming in the LCD according to the first embodiment of the invention.

An LCD according to a first embodiment of the invention as shown in FIGS. 1 to 5 includes: an LCD panel assembly including an LCD panel 3000 and an LCD panel driving unit 4000 to drive the LCD panel 3000; and a backlight assembly including a backlight unit 1000 to supply light to the LCD panel 3000 and a backlight unit driving unit 700 to drive the backlight unit 1000. The LCD may further include upper and lower housing members 2600 and 400 for receiving and protecting the LCD panel assembly and the backlight assembly, respectively. Further, the LCD panel 3000 according to the exemplary embodiment may be divided into a plurality of LCD panel block regions such as A, that is, virtual block regions in a matrix form having a predetermined size that are separated by a predetermined number of data lines and gate. An LED assembly 300 of the backlight unit 1000 may also be divided into a plurality of LED block regions such as B, corresponding to the LCD panel block regions such as A. Further, the LCD panel 3000 and the backlight unit 1000 may be sequentially driven in the same direction, for example, from above to below.

The LCD panel assembly includes a thin film transistor substrate 2220, a color filter substrate 2240 corresponding to the thin film transistor substrate 2220, the LCD panel 3000 including a liquid crystal layer (not shown) injected between the thin film transistor substrate 2220 and the color filter substrate 2240, and the LCD panel driving unit 4000 for driving the LCD panel 3000. The LCD panel 3000 may further include a polarizing plate (not shown) that is formed corresponding to the upper portion of the color filter substrate 2240 and the lower portion of the thin film transistor substrate 2220.

The color filter substrate 2240 is a substrate having color pixels formed by a thin film process. The red R, green G, and blue B pixels produce colors when light passes through them. Common electrodes (not shown) are formed on the entire surface of the color filter substrate 2240. The common electrodes are formed of a transparent electric conductor, such as ITO (Indium Tin Oxide) or IZO (Indium Zinc Oxide).

The thin film transistor substrate 2220 is a transparent glass substrate with thin film transistors (TFTs) and pixel electrodes formed in a matrix form. Data lines are connected to source terminals of the TFTs and gate lines are connected to gate terminals. Further, pixel electrodes (not shown) are formed of a transparent conductive material and are connected to the TFT's drain terminals. The TFTs are turned on or off as electric signals are supplied to the data lines and the gate lines by the LCD panel driving unit 4000 that applies signals to the LCD panel 3000.

The LCD panel driving unit 4000 includes: data-sided and gate-sided tape carrier packages (TCPs) 2260a and 2280a that are connected to the thin film transistor substrate 2220; data-sided and gate-sided printed circuit boards 2260b and 2280b that are respectively connected to the data-sided and gate-sided tape carrier packages 2260a and 2280a; and a field-programmable gate array 2300 (hereafter, referred to as FPGA) that outputs image signals outputted from a graphic control unit 2100, which receives image signals from an external video card, to the LCD panel 3000 and the backlight unit 1000. The LCD panel driving unit 4000 may further include a memory (not shown) where color class table information for color-dimming of the backlight unit 1000 is stored. In addition, the memory may be included in a backlight unit driving unit 700 that is described below.

The FPGA 2300 receives signals from the graphic control unit 2100 and performs coding and decoding of image signals from the graphic control unit 2100, an analog/digital board, as shown in FIG. 2. The FPGA 2300 controls the timing of the image signals to the LCD panel 3000. In this exemplary embodiment, the FPGA 2300 has a signal distributor, and supplies image signals to the liquid crystal panel 3000 and the backlight unit driving unit 700 as well. The FPGA 2300 may include a built-in time controller T-Con that controls the timing of image signals supplied to a source driver and a gate driver of the LCD panel 3000 and may have a separate external timing controller in a form of a chip. Furthermore, the FPGA 2300 may be mounted on a substrate in a form of an IC (Integrated Circuit). Although the FPGA 2300 is mounted on the data-sided printed circuit board 2260b in this exemplary embodiment, it may be located in the graphic control unit 2100. Further, the FPGA 2300 may be located in the backlight unit driving unit.

The backlight assembly supplies light to the LCD panel 3000. The backlight assembly includes: a backlight unit 1000 including an LED assembly 300 with a plurality of LEDs and an optical sheet 500 for improving quality of light emitted from the LEDs of the LED assembly 300; and a backlight unit driving unit 700 for driving the LEDs of the LED assembly 300. The backlight assembly may further include a mold frame 2000 to fix the LED assembly 300 and the optical sheet 500. Further, the LED assembly 300 according to the exemplary embodiment is described with an example in which a plurality of LEDs is disposed on a substrate.

The LED is a light source for the backlight assembly according to the exemplary embodiment of the present invention. The LED may include a light emitting chip that has a compound semiconductor laminated structure with a p-n junction and emits light using re-combination of minor carriers (electrons or holes), a base member where the light emitting chip is mounted, and an external power input member for applying external power to the light emitting chip.

The LED according to the exemplary embodiment of the present invention produces a color using a cluster including red R, green G, and blue B LEDs. That is, color is produced by a combination of red R, green G, and blue B LEDs and one or more LED clusters may be provided. Because the backlight unit 1000 according to the exemplary embodiment of the present invention is driven by a local dimming, the red R, green G, and blue B LEDs may be separately driven. In detail, the clusters can change the color by separately driving the red R, green G, and blue B LEDs.

For efficient color mixing the red R, green G, and blue B LEDs are located adjacent to each other. The arrangement of the LEDs may be a diamond or a rectangular shape in plan view. The arrangement is not limited thereto and may be modified in various shapes as long as the red R, green G, blue B LEDs are disposed close enough so that light emitted from the red R, green G, and blue B LEDs can be effectively mixed. The red R, green G, and blue B LEDs may be replaced with a single package including red R, green G, and blue B light emitting chips, a base member packaging the light emitting chips, and an external power input member supplying external power to the red R, green G, and blue B light emitting chips. However, they are not limited thereto, but a specific light emitting chip having low brightness, for example, a green G light emitting chip may be added. In this configuration, corresponding light emitting chips may be packaged in a single package or the light emitting chips may be separately packaged.

The backlight unit driving unit 700 drives a plurality of LEDs in the LED assembly 300 and may include a color control unit CC and a dimming control unit DC, as shown in FIG. 2. The color control unit CC analyzes color information of the R', G' and B' DATA supplied from the LCD panel driving unit 4000. The color control unit CC also determines a representative color based on the analyzed information and then outputs a corresponding color control signal $S_1$. The dimming control unit DC receives the color control signal $S_1$, and modulate a reference voltage $V_1$ supplied from a power source (not shown) based on the received color signal $S_1$. The dimming control unit DC then outputs dimming control signals $S_2$ including representative color information of the image signals R', G' and B' DATA. The backlight unit driving unit 700 may also be included in the LCD panel driving unit 4000. The color control signal $S_1$ includes a digital signal standing for a representative color of the image signals R', G' and B' DATA. The digital signals may be 2-bit, 4-bit, 6-bit, 8-bit, or 12-bit according to various requirements.

In the LCD according to the exemplary embodiment, image signals that are input to the LCD panel 3000 are input to the FPGA 2300. The FPGA 2300 applies the image signals to the backlight unit driving unit 700 through the signal distributor.

According to the exemplary embodiment, the color control unit CC and the dimming control unit DC are included in the backlight unit driving unit 700, but located elsewhere, as desired, such as in the FPGA 2300. The color control unit CC and the dimming control unit DC receives image signals from the signal distributor in the FPGA 2300.

The LCD classifies image signals R', G' and B' DATA into color classes based on color characteristics of the respective pixels that are input from the graphic control unit 2100. The LCD then performs color-dimming by controlling the color of the LED block region B such that the representative color of the LCD panel block region A can be the same as or similar to the color of the LED block region B corresponding thereto.

Color dimming, as shown in the flowchart of FIG. 3, may be performed through the steps of storing color class table information in a memory (Step S1), extracting image color signals for each pixel data in the LCD panel block region (Step S2), classifying the color class of the pixel data in the LCD panel block region (Step S3), mapping the color class of the LCD panel block region into a color coordinate system (Step S4), determining representative color of the LCD panel block region (Step S5), and adjusting the color of the LED block region to the representative color (Step S6).

In storing the color class table information in the memory (Step S1), the entire gradation is divided into a plurality of color classes as shown in FIG. 4 according to the gamma curve of the LCD panel 3000 for each color. Unlike brightness, it is difficult for the human eye to distinguish similar colors. Therefore, according to the exemplary embodiment, the red R, green G, and blue B are respectively divided into predetermined color gradations, for example 256 gradations. Then adjacent color gradations in the respective color gradations that are difficult to be distinguished by the eye are defined as one color class. According to the exemplary embodiment, as shown in FIG. 4, the 256 color gradations are divided into four color classes by grouping color gradations having the same or similar visibility together. In this way, the red, green, and blue colors have four color classes respectively. Therefore, according to the exemplary embodiment, 4×4×4 color classes may be defined for 256×256×256 total gradations.

According to the exemplary embodiment, the red R, green G, and blue B are respectively divided into four color classes Class 1 to Class 4, Class_a to Class_d and Class_1α to Class_4δ. However, the number of color classes may be varied by grouping colors having the same or similar visibility into a color region. The number of color classes for each color may be the same as or different from each other. The size of the divided color classes may be different depending on the color gradations. Further, the color class table information, the information of the color classes, may be stored in advance in the memory. According to the exemplary embodiment, the memory is provided in the LCD panel driving unit 4000, but may be provided in the backlight unit driving unit 700.

In extracting the color image signals for the pixel data of the LCD panel block region (Step S2), image signals are extracted through the signal distributor to determine color classes by comparing the image signals of the LCD panel block region A with the color class table information.

During classifying the color class of the pixel data of the LCD panel block region A (Step S3), a color class is determined by comparing the red, green, and blue image signals for the pixels extracted through the signal distributor with the color class table information.

For example, since the gradation of red R of the extracted red R, green G, and blue B pixel data as shown in FIG. 4 is between 127th step and 191st step, it is given with a class 3 of the red color class. Further, the gradation of green G is between 0th step and 63rd step and given with a Class_a of the green color class. The gradation of blue B is between 0th step and 63rd step and given with a Class_1α of the blue color class. Therefore, the selected pixel is given with a color class of Class3a1α. In other words, when the pixel data has adjacent color gradations in a predetermined range, the pixel data is given with the same color class.

During mapping of the color class of the LCD panel block region A into a color coordinate system (Step S4), the color class of the LCD panel block region A is mapped into the color coordinate system having divided color regions. For example, the color class is mapped into corresponding color class region in a CIE 1976 UCS color coordinate system shown in FIG. 5. Color gradations with similar visibility are defined as one color region in the color coordinate system and the color coordinate system may include a plurality of color regions. Further, the plurality of color regions is represented in a table. The table information of the color coordinate system, where the plurality of color regions is represented in a table, may be stored in a memory with the color class table information. Further, the red R, green G, and blue B pixel data, which are inputted in the LCD panel block region A, are assigned with a color class according to a gradation step for each color, and then mapped into the color coordinate system in the above. However, the embodiment is not limited thereto. Direct mapping into the color coordinate system may also be possible by omitting the step of assigning color class. It is preferable to define color gradations with the same or similar visibility in one color region of the color coordinate system.

During determining the representative color of the LCD panel block region (Step S5), when the color classes are mapped into the color coordinate system, a color region into which the color classes are most frequently mapped in the color coordinate system is determined as the representative color.

During color-dimming of the LED block region by the representative color (Step S6), a color control signal for the representative color is supplied to the dimming control unit, so that the dimming control unit can adjust the color of the LED block region B to be the same as or similar to the representative color of the LCD panel block region A.

The color control signal for the representative color is supplied to the LED block region B through the color control unit CC and the dimming control unit DC. As such, the color of the LED block region B is adjusted to correspond to the representative color of the LCD panel block region A. It is efficient to perform color-dimming by adjusting currents of the red, green, and blue LEDs included in the corresponding LED block region B in order to generate the corresponding color. The color region in which the most color classes are mapped in the color coordinate system is determined as the representative color. However, it is effective to perform color-dimming when the ratio of the color classes mapped into the color region determined as the representative color to total color classes mapped into the whole color coordinate system is greater than a predetermined value, for example, 70% or more.

A process of color-dimming is described as follows. The LCD panel 3000 is divided into virtual LCD panel block regions such as A having a predetermined size in a matrix form, which are sequentially driven. Image display is then completed for the LCD panel block regions A in the first low of the LCD panel block regions. Then color-dimming for the LED block regions B in the first row of the LED block regions starts. While color-dimming of the LED block regions B in the first row is processed, image display starts for the LCD panel block regions in the second row. After the image display for the LCD panel block regions in the second row is completed, color-dimming of the LED block regions in the second row starts. However, the above operation is not limited thereto. The signal distributor may apply image signals to the LCD panel driving unit 4000 and the backlight unit driving unit 700 at the same time, so that image display of the LCD panel 3000 and color-dimming of the backlight unit 1000 in a corresponding region can be performed simultaneously.

In the LCD according to the exemplary embodiment as shown in FIG. 6A, for example, an LCD panel displays yellow in a region where sunlight falls, and displays gray as the distance away from the sun-lit region increases. Accordingly, the LED block regions corresponding to the sun-lit portions of the backlight unit 1000 are color-dimmed to display yellow, and the other LED block regions are color-dimmed to display corresponding colors to the representative colors of the corresponding LCD panel block regions as shown in FIG. 6B.

As described above, according to the exemplary embodiment, an LCD with superior color reproducibility can be provided by performing color-dimming to adjust colors of the LED block regions using the representative colors of the corresponding LCD panel block regions. Further, according to the exemplary embodiment, power consumption of the LCD can be reduced through the color-dimming, because LEDs are turned off when they are not in use or applied current are reduced to a desired level.

An LCD which performs color-dimming and brightness-dimming at the same time according to a second embodiment of the invention is described hereafter with reference to accompanying drawings. An overlapping configuration with the LCD according to the first embodiment of the invention will be omitted or described briefly hereafter.

Figure 7:
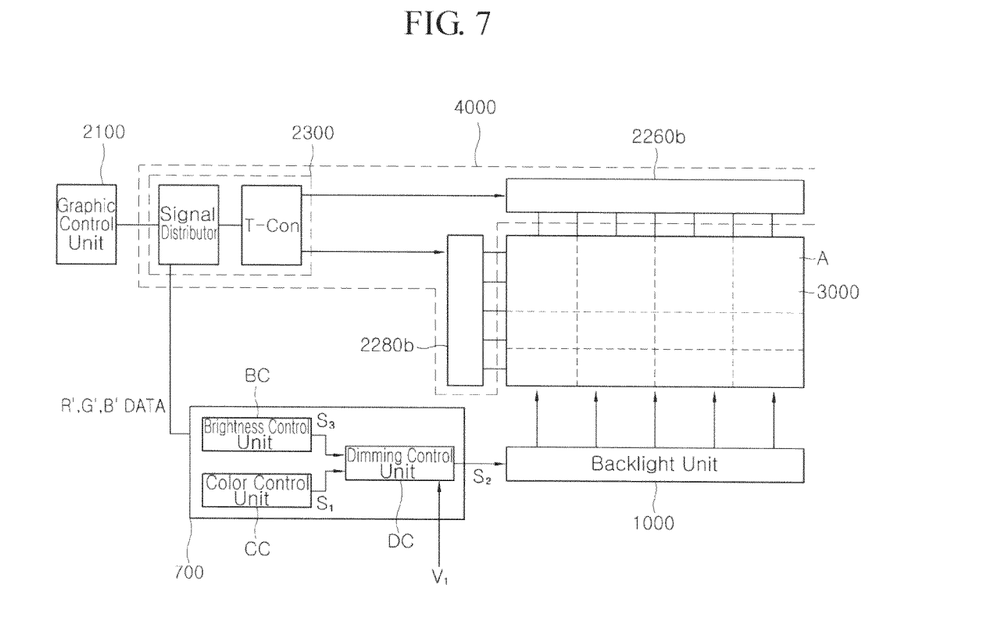
FIG. 7 is a schematic view of an LCD according to a second embodiment of the invention.
Figure 8:
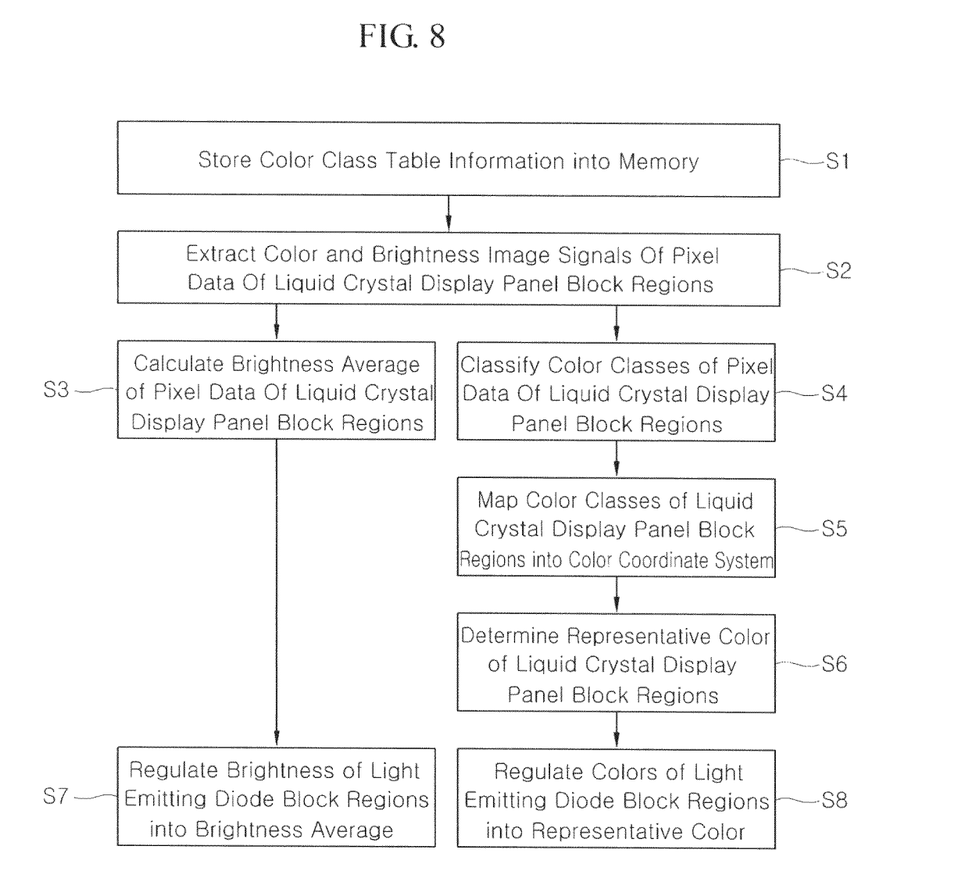
FIG. 8 is a flowchart illustrating a process of color-dimming and brightness-dimming in the LCD according to the second embodiment of the invention.
Figure 9:
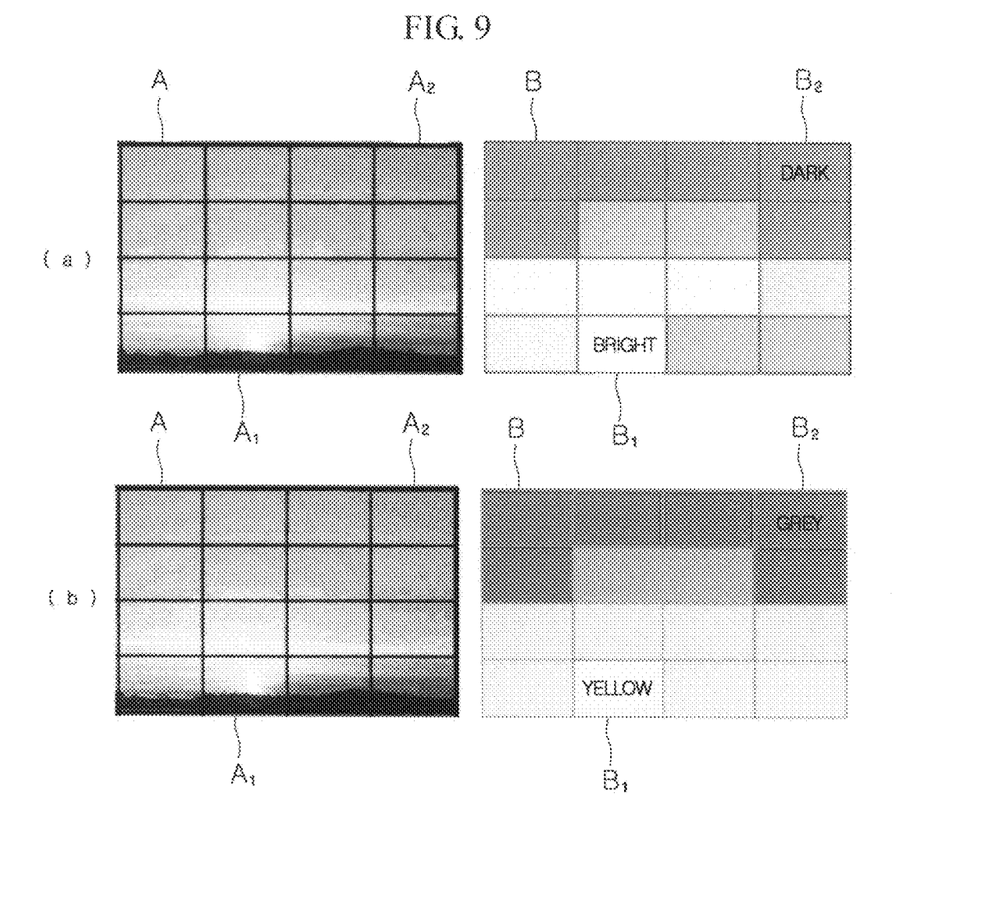
FIGS. 9A and 9B are views illustrating a process of brightness-dimming and color-dimming respectively in the LCD according to the second embodiment of the invention.

FIG. 7 is a schematic view of an LCD according to a second embodiment of the invention. FIG. 8 is a flowchart illustrating a process of color-dimming and brightness-dimming in the LCD according to the second embodiment of the invention. FIGS. 9A and 9B are views illustrating a process of color-dimming and brightness-dimming in the second embodiment of the invention.

An LCD according to the second embodiment of the present invention, as shown in FIG. 7, includes an LCD panel assembly including an LCD panel 3000 and an LCD panel driving unit 4000 that drives the LCD panel 3000, and a backlight assembly including a backlight unit 1000 that supplies light to the LCD panel 3000 and a backlight unit driving unit 700 that drives the backlight unit 1000. Further, the LCD panel 3000 according to the exemplary embodiment may also be divided into a plurality of LCD panel block regions such as A as in the first embodiment. The LCD panel block regions are virtual block regions having a predetermined size arranged in a matrix form. An LED assembly 300 of the backlight unit 1000 may also be divided into a plurality of LED block regions such as B, so that the LED block regions correspond to the LCD panel block regions. Further, the LCD panel 3000 and the backlight unit 1000 may be sequentially driven in the same direction.

A backlight unit driving unit 700 according to the exemplary embodiment includes a brightness control unit BC, in addition to a color control unit CC and a dimming control unit DC in order to perform color-dimming and brightness-dimming at the same time. The brightness control unit BC analyzes brightness information of image signals R', G', B' and W' DATA supplied from the LCD panel driving unit 4000 that applies signals to the LCD panel 3000. The brightness control unit BC then determines average brightness based on the analyzed information, and then outputs corresponding brightness control signals $S_3$. The color control unit CC analyzes color information of the image signals R', G', B' and W' DATA 3000, and determines representative color based on the analyzed information. The color control unit CC then outputs corresponding color control signals $S_1$. The dimming control unit DC receives the brightness control signals $S_3$ and the color control signals $S_1$. The dimming control unit DC then modulates a reference voltage signal $V_1$ applied from a power supplier (not shown) based on the received signals in order to output dimming control signals $S_2$ including information about average brightness and representative color of the image signals R', G', B' and W' DATA.

The brightness control signal $S_3$ expresses the average brightness of the image signals R', G', B' and W' DATA in a form of digital signal. The color control signal $S_1$ expresses the representative color of the image signals R', G', B' and W' DATA in a form of digital signal. The image signals R', G', B' and W' DATA may include only red, green, and blue image signals R', G' and B' DATA of each pixel as described in the first embodiment. White image signal W' DATA can be obtained from the red, green, and blue image signals R', G' and B' DATA. The LCD according to the exemplary embodiment continuously performs brightness-dimming by calculating average brightness of the LCD block regions using the white image signals W' DATA. In addition, The LCD according to the exemplary embodiment performs color-dimming continuously or intermittently using red, green, and blue image signals R', G' and B' DATA. The color control unit CC, brightness control unit BC, and dimming control unit DC are advantageously included in the backlight unit driving unit 700 in the exemplary embodiment, but it is not essential to do so. The color control unit CC, brightness control unit BC, and dimming control unit DC may be included in an FPGA 2300.

The color dimming is processed through steps $S_1$ to $S_8$ as shown in the flowchart of FIG. 8. Color class table information is stored in a memory (S1). Color and brightness data for each pixel data in the LCD panel block regions are extracted (S2). Average brightness of the pixel data in the LCD panel block region is calculated (S3). Color class of the pixel data in the LCD panel block region is determined (S4). The color class of the LCD panel block region is mapped into a color coordinate system (S5). A representative color of the LCD panel block region is determined (S6). The brightness of the LED block regions is adjusted to have the average brightness (S7). The color of the LED block region is adjusted to have the representative color (S8).

While storing the color class table information in the memory (S1), the entire gradation is divided into a plurality of color classes according to characteristics of the gamma curve of the LCD panel 3000, as in the first embodiment of the invention. That is, the red R, green G, and blue B are divided into predetermined color gradations respectively, and then adjacent color gradations, the difference of which is hardly distinguishable by a human, are defined as a color class. The color class table information, which includes information about color classes, may be stored in advance in the memory. Although the memory is located in the LCD panel driving unit 4000 in this exemplary embodiment, the memory may be located in the backlight unit driving unit 700 as in the first embodiment of the invention.

Next, while extracting the color and brightness image signals of the pixel data of the LCD panel block regions (S2), image signals are extracted through the signal distributor to determine the color class by comparing the image signals of the LCD panel block regions A with the color class table information, and to obtain average brightness.

While calculating the average brightness of the pixel data of the LCD panel block region (S3), brightness characteristics is analyzed from the extracted image signals of the pixels in the LCD panel block region, and then the average brightness of the entire LCD panel block is calculated. That is, the average brightness is calculated by summing up the brightness of the pixels of the LCD panel block region and dividing the total brightness by the number of pixels in the LCD panel block region.

While classifying color class of the pixel data of the LCD panel block region (S4), the color class is assigned by comparing the red, green, and blue image signals of the pixels extracted through the signal distributor with the color class table information, as in the first embodiment of the invention.

While mapping the color class of the LCD panel block region into a color coordinate system (S5), the color class of the LCD panel block region is mapped into the color coordinate system having divided color regions.

The representative color of the LCD block region (S6), a color region into which the color classes are most frequently mapped in the color coordinate system, is determined as the representative color. The representative color is determined by assigning color classes to the respective red R, green G, and blue B pixel data that is inputted into the LCD panel block region according to the gradation steps, and then mapping the color classes into the color coordinate system. However, the method is not limited thereto. The representative color may be determined by mapping the most frequent color into the color coordinate system.

During brightness-dimming of the LED block region to the average brightness (S7), a brightness control signal corresponding to the average brightness is supplied to the dimming control unit, and the dimming control unit adjusts the brightness of the LED block region to be corresponding to the average brightness of the LCD panel block region.

During color-dimming of the LED block regions to the representative color (S8), a color control signal corresponding to the representative color is supplied to the dimming control unit, and the dimming control unit adjusts the color of the LED block region to be similar to or the same as the representative color of the LCD panel block region.

While adjusting the brightness of the LED block region to the average brightness (S7) and adjusting the color of the LED block regions to the representative color (S8): a brightness control signal corresponding to the average brightness of the LCD panel block region is supplied to the LED block region from the brightness control unit BC through the dimming control unit DC; and a color control signal corresponding to the representative color is supplied to the dimming control unit DC from the color control unit CC. The color control signal and brightness control signal supplied to the dimming control unit DC adjust the color and brightness of the LED block region to be corresponding to the representative color and the average brightness of the LCD panel block region. It is efficient to perform color-dimming by individually controlling currents of a plurality of red, green, and blue LEDs in the corresponding LED block regions B. And it is efficient to perform brightness dimming by controlling the currents of the red, green, and blue LEDs together.

In the LCD according to the exemplary embodiment, brightness dimming and color dimming may be continuously performed. Alternatively, brightness dimming may be performed continuously and color dimming may be performed intermittently.

In the LCD according to the exemplary embodiment as shown in FIG. 9A, for example, the LCD panel 3000 is brightest in a region $A_1$ where sunlight falls and becomes darker as the distance from the sun-lit area becomes greater in the LCD panel regions A. Accordingly, the backlight unit 1000 increases the brightness of the region $B_1$ corresponding to the sun-lit portion of the LED block regions B, and adjusts the other regions such as $B_2$ in the LED block regions B to have corresponding brightness to the average brightness of the region $A_2$ of the LCD panel block regions A.

As shown in FIG. 9B, LED block regions B is adjusted to have a color which is substantially the same as the representative color of the LCD panel block regions A by performing color-dimming in addition to brightness-dimming. That is, the region $B_1$ of the LED block regions B, which corresponds to the region $A_1$ of the LCD panel regions A where the yellow sun-lit area is displayed, is adjusted to produce yellow. The region $B_2$ of the LED block regions B, which corresponds to the gray region $A_2$ of the LCD panel regions A far from the sun-it portion, is adjusted to produce gray. Therefore, according to this exemplary embodiment, color-dimming is performed by individually controlling red, green, and blue LEDs, and brightness-dimming is performed by controlling the entire brightness of the red, green, and blue LEDs.

As described above, in the LCD according to the exemplary embodiment, brightness dimming and color dimming may be continuously performed. Alternatively, brightness dimming may be performed continuously and color dimming may be performed intermittently. Accordingly, color reproducibility can be improved by adjusting color and brightness of LED block regions B to be corresponding to the representative color and average brightness of the LCD panel regions A. Further, the LCD according to the exemplary embodiment emits light after adjusting the color and brightness of the LED block regions B to match with the color and brightness required by the LCD panel regions A, i.e. the representative color and average brightness, so that color reproducibility is improved and power consumption is reduced.

An LCD additionally including white LEDs to ensure additional brightness according to a third embodiment is described hereafter with reference to the accompanying drawings. Overlapping configurations with the first and second embodiments of the present invention are skipped or briefly described hereafter.

Figure 10:
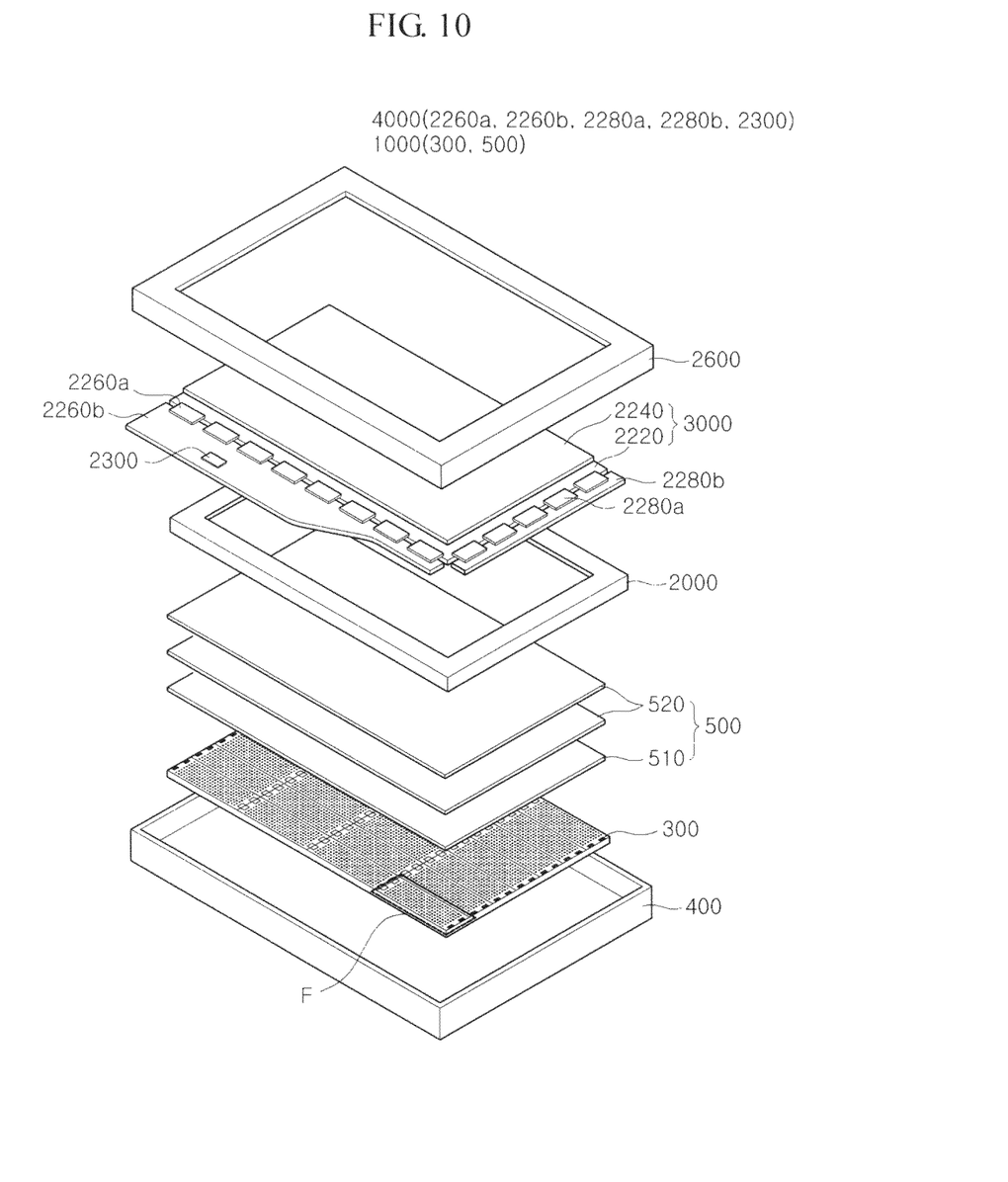
FIG. 10 is a schematic exploded perspective view of an LCD according to a third embodiment of the invention.
Figure 11:
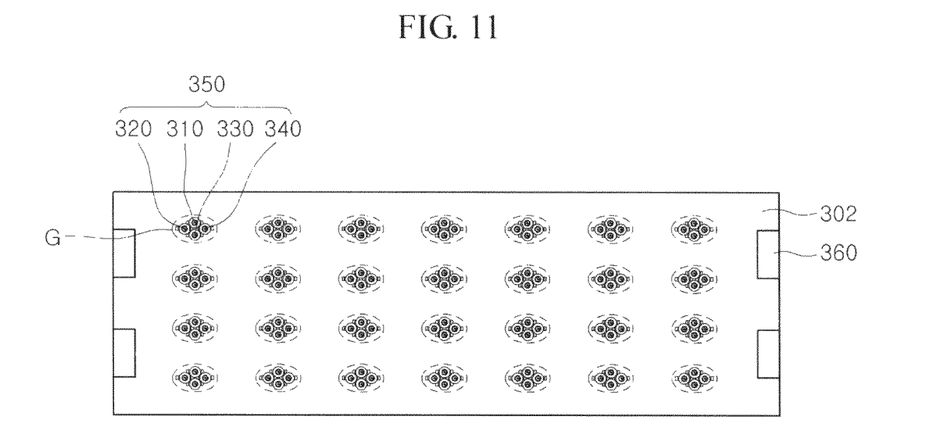
FIG. 11 is an enlarged plan view of an LED assembly showing F-region in FIG. 10.
Figure 12:
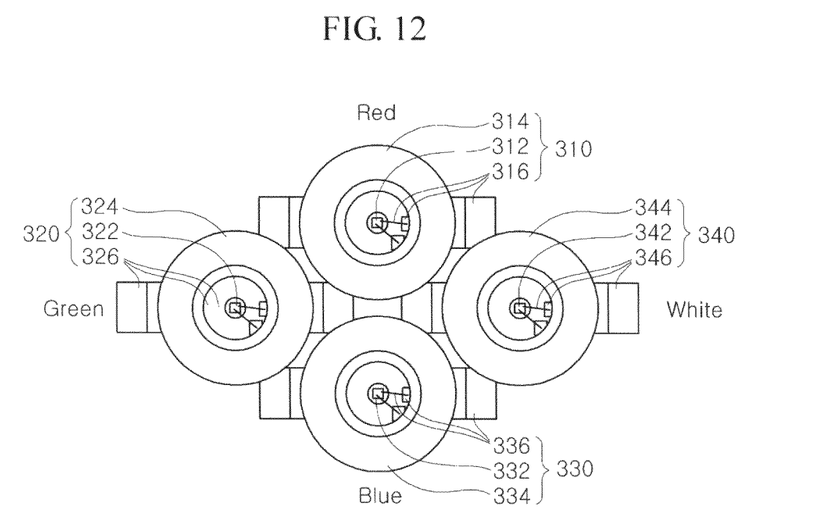
FIG. 12 is an enlarged partial plan view of the LED assembly showing G-region in FIG. 11.

FIG. 10 is a schematic exploded perspective view of an LCD according to a third embodiment of the invention. FIG. 11 is an enlarged plan view of an LED assembly showing F-region of FIG. 10. FIG. 12 is an enlarged plan view of an LED assembly showing G-region of FIG. 11.

The LCD according to the third embodiment of the invention, as shown in FIGS. 10 and 11, includes an LCD panel assembly and a backlight assembly. The LCD panel assembly includes an LCD panel 3000 to display images, and an LCD panel driving unit 4000 to drive the LCD panel 3000. The backlight assembly includes a backlight unit 1000 having red R, green G, blue B, and white W LEDs to supply light to the LCD panel 3000, and a backlight unit driving unit 700 to drive the backlight unit 1000. Further, the LCD panel 3000 according to the exemplary embodiment may also be divided into a plurality of virtual LCD panel block regions which has a predetermined size and is arranged in a matrix form as in the first embodiment. An LED assembly 300 of the backlight unit 1000 may also be divided into a plurality of LED block regions to be corresponding to the LCD panel block regions. Further, the LCD panel 3000 and the backlight unit 1000 may be sequentially driven in the same direction.

The LED assembly 300 includes a substrate 302 and LEDs 350 mounted on the substrate 302. A reflective film (not shown) may be formed on the substrate 302. The reflective film reflects light, which is emitted from the LEDs 350 to the substrate 302, towards above the substrate 302.

A PCB (Printed Circuit Board) may be used for the substrate 302. The LEDs 350 are mounted onto the substrate 302 and external power is supplied to the substrate. Alternatively, an MCPCB (Metal Core Printed Circuit Board), an FR4, or a BT (Bismaleimide Triazine) resin may be used for the substrate 302. The substrate 302 is not limited to the above examples, and any substrate can be used if it is appropriately configured for mounting the LEDs 350 thereon and supplying external power thereto.

The substrate 302 according to the exemplary embodiment of the invention includes wires (not shown) to mount a plurality of LEDs 350 thereon and to supply external power thereto. The LEDs 350 can be electrically connected through the wires with each other. Moreover, the substrate 302 according to the exemplary embodiment of the invention may include connections 360, such as connectors, to electrically connect the LED assembly 300 and to receive external power. The connections 360 and the LEDs 350 may be connected through the wires on the substrate 302.

The LCD according to the exemplary embodiment further includes white W LEDs 340, in addition to red R, green, G, and blue B LEDs 310, 320 and 330 to ensure higher brightness of the backlight unit 1000.

As shown in FIG. 12, each of the red, green, blue, and white LEDs 310, 320, 330 and 340 may be a single package. The single packages include: red, green, blue and white light emitting chips 312, 322, 332 and 342; base members 314, 324, 334 and 344 for packaging the light emitting chips; and external power input members 316, 326, 336 and 346 for supplying external power to the red, green, blue, and white light emitting chips 312, 322, 332, 342, respectively. A cluster may be formed by closely arranging the single packages, that is, the red, green, blue, and white LEDs 310, 320, 330 and 340.

The LCD having the above configuration according to the exemplary embodiment ensures sufficient brightness by controlling the white LEDs 340 in response to white image signals W' DATA. That is, brightness of a cluster can be adjusted by adjusting brightness of the white LED 340 only, for example, when adjusting brightness at an interface of bright and dark regions where brightness distribution of an image signal changes gradually. When sufficient brightness can be ensured by the red, green, and blue LEDs only to display colorful images, the white LEDs can be turned off to minimize power consumption.

In the LCD according to the exemplary embodiment, brightness dimming can be performed using the white LEDs only, and color dimming can be performed using the red, green, and blue LEDs. Accordingly, brightness dimming and color dimming can be performed separately.

According to the exemplary embodiments of the present invention, there is provided a backlight unit, a backlight assembly having the backlight unit, an LCD having the backlight assembly, which has superior color reproducibility by adjusting color of LEDs in the backlight unit to a representative color of LCD panel block regions, and method of dimming the LCD.

The exemplary embodiments of the present invention provide a backlight assembly, an LCD having the same, and method of dimming the LCD, wherein the backlight assembly is capable of reducing power consumption by turning off LEDs that are not in use and by reducing amount of supplied current through color dimming and brightness dimming.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A backlight assembly that supplies light to a liquid crystal display panel, the backlight assembly comprising:
a light emitting diode assembly comprising at least one light emitting diode block region having a plurality of light emitting diodes;
a backlight unit driving unit comprising a color control unit configured to determine a representative color of the light emitting diode block region using at least one image signal supplied to the liquid crystal display panel, wherein color classes are determined for the at least one image signal, wherein the color classes are mapped into color regions in a color coordinate system, wherein the color regions are determined according to visibilities, wherein the color control unit defines a visibility associated with a color region in the color coordinate system into which the color classes of the at least one image signal are most frequently mapped as the representative color of the light emitting diode block region, and wherein at least one color class of the color classes of the at least one image signal corresponds to a plurality of color gradations; and
a dimming control unit configured to control color of the light emitting diode block region based on the representative color of the light emitting diode block region determined by the color control unit,
wherein the light emitting diode assembly comprises red light emitting diodes, green light emitting diodes, blue light emitting diodes, and white light emitting diodes, and
wherein brightness of the light emitting diode assembly is adjusted by adjusting brightness of the white light emitting diodes without adjusting brightness of the red light emitting diodes, the green light emitting diodes, or the blue light emitting diodes.

2. The backlight assembly of claim 1, wherein the backlight unit driving unit further comprises:
a memory to store color coordinate system table information comprising a plurality of color regions in the color coordinate system.

3. The backlight assembly of claim 1,
wherein the liquid crystal display panel comprises a liquid crystal display panel block region corresponding to the light emitting diode block region, and
wherein the representative color of the liquid crystal display panel block region is determined as the representative color of the light emitting diode block region.

4. The backlight assembly of claim 1, further comprising:
a brightness control unit that determines brightness of the light emitting diode block region and transmits brightness control signals to a dimming control unit.

5. The backlight assembly of claim 4, wherein the brightness control unit determines an average brightness of brightness signals supplied to a plurality of liquid crystal display panel block regions as a representative brightness.

6. The backlight assembly of claim 1,
wherein the backlight unit driving unit further comprises color class table information, the color class table information including a plurality of red color classes formed according to red color gradations and according to human-eye red color distinguishing capability, a plurality of green color classes formed according to green color gradations and according to human-eye green color distinguishing capability, and a plurality of blue color classes formed according to blue color gradations and according to human-eye blue color distinguishing capability, and
wherein one or more of the color classes of the at least one image signal are among the plurality of red color classes, the plurality of green color classes, and the plurality of blue color classes.

7. A liquid crystal display comprising:
a liquid crystal display panel configured to display images, the liquid crystal display panel including a plurality of liquid crystal display panel block regions;
a liquid crystal display panel driving unit configured to drive the liquid crystal display panel;
a light emitting diode assembly that supplies light to the liquid crystal display panel and comprises a plurality of light emitting diode block regions including at least one light emitting diode block region and having a plurality of light emitting diodes; and
a backlight unit driving unit comprising a color control unit configured to determine a representative color set of the light emitting diode block region using at least one image signal supplied to the liquid crystal display panel, the backlight unit driving unit further comprising a dimming control unit configured to control colors of the light emitting diode block region based on the representative color set of the light emitting diode block region determined by the color control unit, wherein color classes are determined for the at least one image signal, wherein the color classes are mapped into color regions in a color coordinate system, wherein the color regions are determined according to visibilities, wherein the color control unit defines a color region in the color coordinate system into which the color classes of the at least one image signal are most frequently mapped as the representative color set of the light emitting diode block region, and wherein at least one color class of the color classes of the at least one image signal corresponds to a plurality of color gradations,
wherein the light emitting diode assembly comprises red light emitting diodes, green light emitting diodes, blue light emitting diodes, and white light emitting diodes, and
wherein brightness of the light emitting diode assembly is adjusted by adjusting brightness of the white light emitting diodes without adjusting brightness of the red light emitting diodes, the green light emitting diodes, or the blue light emitting diodes.

8. The liquid crystal display of claim 7,
wherein the light emitting diode block regions are disposed in positions corresponding to the liquid crystal display panel block regions,
wherein the backlight unit driving unit further comprising color class table information, the color class table information including a plurality of red color classes formed according to red color gradations and according to human-eye red color distinguishing capability, a plurality of green color classes formed according to green color gradations and according to human-eye green color distinguishing capability, and a plurality of blue color classes formed according to blue color gradations and according to human-eye blue color distinguishing capability, and wherein one or more of the color classes of the at least one image signal are among the plurality of red color classes, the plurality of green color classes, and the plurality of blue color classes.

9. The liquid crystal display of claim 7, wherein
the liquid crystal display panel driving unit comprises a field-programmable gate array (FPGA), and
image signals are distributed to the liquid crystal display panel block regions and the backlight unit driving unit by a signal distributor.

10. The liquid crystal display of claim 9, wherein the backlight unit driving unit further comprises a brightness control unit that determines an average brightness of the light emitting diode block regions further using red, green, and blue image signals.

11. The liquid crystal display of claim 9, wherein the field-programmable gate array comprises the color control unit and the dimming control unit.

12. The liquid crystal display of claim 9, wherein the field-programmable gate array further comprises the brightness control unit.

13. The liquid crystal display of claim 7, wherein the light emitting diodes comprises red, green, and blue light emitting diodes.

14. The liquid crystal display of claim 13, wherein the light emitting diodes further comprises:
a white light emitting diode for brightness control, in addition to the red, green, and blue light emitting diodes for color control.

15. A method for driving backlight assembly, the method comprising:
classifying color classes of liquid crystal display panel block regions using color class table information;
determining a representative color using color classes of at least one image signal corresponding to a liquid crystal display panel block region among the liquid crystal display panel block regions, wherein the determining the representative color comprises: mapping the color classes of the at least one image signal into color regions in a color coordinate system, wherein the color regions are determined according to visibilities, and determining a visibility associated with a color region into which the color classes of the at least one image signal are most frequently mapped in the color coordinate system as the representative color corresponding to the liquid crystal display panel block region, wherein at least one color class of the color classes of the at least one image signal corresponds to a plurality of color gradations;
adjusting at least a color of a light emitting diode block region corresponding to the liquid crystal display panel block region according to the representative color; and
adjusting brightness of a light emitting diode assembly that comprises the light emitting diode block region by adjusting brightness of white light emitting diodes of the light emitting diode assembly without adjusting brightness of red light emitting diodes, green light emitting diodes, or blue light emitting diodes of the light emitting diode assembly.

16. The method of claim 15, wherein the classifying the color classes of the liquid crystal display panel block regions comprises:
storing the color class table information into a memory;
extracting image signals of pixels in the liquid crystal display panel block regions; and
classifying the color classes of the liquid crystal display panel block regions by comparing the image signals with the color class table information.

17. The method of claim 16, wherein the storing the color class table information into the memory comprises:
dividing red, green, and blue into color gradations;
grouping adjacent red color gradations of the color gradations into the plurality of red color classes;
grouping adjacent green color gradations of the color gradations into the plurality of green color classes;
grouping adjacent blue color gradations of the color gradation into the plurality of blue color classes; and
storing the color class table information into the memory after arranging the red color classes, the green color classes, and the blue color classes in a table.

18. The method of claim 15, wherein the color class table information includes a plurality of red color classes formed according to red color gradations and according to human-eye red color distinguishing capability, a plurality of green color classes formed according to green color gradations and according to human-eye green color distinguishing capability, and a plurality of blue color classes formed according to blue color gradations and according to human-eye blue color distinguishing capability.

19. The method of claim 18, wherein the mapping the color classes into the color regions in the color coordinate system comprises:
mapping the color classes of the liquid crystal display panel block regions into corresponding color regions that are associated with corresponding visibilities.

20. The backlight assembly of claim 1, wherein the number of color classes for the red color classes, green color classes and blue color classes are different from each other.

* * * * *